(12) United States Patent
Wang et al.

(10) Patent No.: US 11,653,340 B2
(45) Date of Patent: May 16, 2023

(54) USER EQUIPMENT, BASE STATION AND WIRELESS COMMUNICATION METHOD

(71) Applicant: Panasonic Intellectual Property Corporation of America, Torrance, CA (US)

(72) Inventors: Lilei Wang, Beijing (CN); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 36 days.

(21) Appl. No.: 17/256,283

(22) PCT Filed: Aug. 7, 2018

(86) PCT No.: PCT/CN2018/099150
§ 371 (c)(1),
(2) Date: Dec. 28, 2020

(87) PCT Pub. No.: WO2020/029067
PCT Pub. Date: Feb. 13, 2020

(65) Prior Publication Data
US 2021/0266895 A1  Aug. 26, 2021

(51) Int. Cl.
*H04W 72/0446* (2023.01)
*H04L 5/00* (2006.01)
(Continued)

(52) U.S. Cl.
CPC ....... *H04W 72/0446* (2013.01); *H04L 5/0048* (2013.01); *H04L 27/2607* (2013.01); *H04W 72/20* (2023.01)

(58) Field of Classification Search
CPC ............. H04W 72/02; H04W 72/0406; H04W 72/0446; H04L 27/2607; H04L 5/0005;
(Continued)

(56) References Cited

U.S. PATENT DOCUMENTS

2017/0318564 A1   11/2017  Lee et al.
2018/0035427 A1   2/2018   Gupta et al.
(Continued)

FOREIGN PATENT DOCUMENTS

JP    2017-530653 A     10/2017
WO    WO-2018174688 A1 *  9/2018  .......... H04W 52/383

OTHER PUBLICATIONS

Extended European Search Report dated Jun. 15, 2021, for the corresponding European Patent Application No. 18929429.1, 10 pages.

(Continued)

*Primary Examiner* — Rina C Pancholi
(74) *Attorney, Agent, or Firm* — Seed IP Law Group LLP

(57) ABSTRACT

Provided are a user equipment, a base station and wireless communication methods related to physical resource configuration for sidelink communication in NR. A user equipment comprises: circuitry which, in operation, determines a Transmission Time Interval (TTI) assigned for transmitting and/or receiving a physical sidelink channel in a carrier; and a transceiver which, in operation, transmits and/or receives the physical sidelink channel based on the TTI in the carrier, wherein the duration of the TTI is less than a slot duration.

18 Claims, 10 Drawing Sheets

(51) Int. Cl.
*H04L 27/26* (2006.01)
*H04W 72/20* (2023.01)

(58) Field of Classification Search
CPC ... H04L 5/0007; H04L 5/0044; H04L 5/0048; H04L 5/0051; H04L 5/0053; H04L 5/0091
See application file for complete search history.

(56) References Cited

U.S. PATENT DOCUMENTS

| | | | |
|---|---|---|---|
| 2018/0077721 A1 | 3/2018 | Nory et al. | |
| 2020/0022089 A1* | 1/2020 | Guo | H04B 17/327 |
| 2020/0029340 A1* | 1/2020 | He | H04W 72/10 |
| 2020/0275458 A1* | 8/2020 | Khoryaev | H04W 4/46 |
| 2021/0036834 A1* | 2/2021 | Lee | H04L 5/0051 |

OTHER PUBLICATIONS

ITRI, "Discussion on Short TTI for V2X Phase 2," R1-1719683, Agenda Item: 6.2.3.6, 3GPP TSG RAN WG1 Meeting #91, Reno, USA, Nov. 27-Dec. 1, 2017, 4 pages.
International Search Report, dated Apr. 28, 2019, for corresponding International Application No. PCT/CN2018/099150, 3 pages.
Intel Corporation, "Considerations on Support of Short TTI for LTE V2V Sidelink Communication," R1-1704688, Agenda item: 7.2.3.3, 3GPP TSG RAN1 WG Meeting #88bis, Spokane, USA, Apr. 3-7, 2017, 10 pages.
Intel Corporation, "Considerations on Support of Short TTI for LTE V2V Sidelink Communication," R1-1707307, Agenda item: 6.2.3.3.2, 3GPP TSG RAN WG1 Meeting #89, Hangzhou, P.R. China, May 15-19, 2017, 8 pages.
Intel Corporation, "Short TTI Design Options for LTE V2V Sidelink Communication," R1-1712487, Agenda item: 5.2.3.4.1, 3GPP TSG RAN WG1 Meeting #90, Prague, Czech Republic, Aug. 21-25, 2017, 8 pages.
ZTE, "Consideration on short TTI based PC5 operation," R2-1708511, Agenda item: 9.10.4, 3GPP TSG-RAN WG2 Meeting #99, 3GPP TSG-RAN WG2 Meeting #99, Aug. 21-25, 2017, 5 pages.
Huawei, HiSilicon, "Short TTI solutions for R15 sidelink," R1-1712099, Agenda Item: 5.2.3.4.1, 3GPP TSG RAN WG1 Meeting #90, Prague, Czech Republic, Aug. 21-25, 2017. (4 pages).
Indian Office Action, dated Sep. 21, 2022, for Indian Patent Application No. 202047056724. (6 pages).

* cited by examiner

USER EQUIPMENT, BASE STATION AND WIRELESS COMMUNICATION METHOD

BACKGROUND

1. Technical Field

The present disclosure relates to the field of wireless communication, and in particular, to a user equipment (UE), a base station (gNB) and wireless communication methods related to physical resource configuration for transmitting or receiving physical sidelink channel in NR (New Radio access technology).

2. Description of the Related Art

In the Long Term Evolution (LTE) of the Third Generation Partnership Project (3GPP), a carrier (also called as "cell") is radio resource in time domain and in frequency domain. The carrier can be subdivided into a plurality of subcarriers in frequency domain, and can be subdivided into a plurality of frames in time domain. One frame can be subdivided into ten subframes, and each subframe can be subdivided into two slots. Each subframe consists of a given number of OFDM symbols in the time domain (12 or 14 symbols). The OFDM symbols each consists of a number of modulation symbols transmitted on respective subcarriers. The transmission and/or reception of the data and control information can be performed on a TTI (Transmission Time Interval) basis in the time domain, and a TTI duration can be one subframe or a multiple of subframes.

The LTE sidelink based V2X (Vehicle to anything) has been specified in Release14 and Release15 of the 3GPP specifications. In LTE, no shortened TTI is supported for physical sidelink channel, and the allocation of TTI is on subframe level. In LTE, the PSCCH (sidelink control channel) and associated PSSCH (sidelink data channel) are located in the same subframe and they are Frequency Division Multiplexed (FDMed).

In LTE V2X, sensing is operated on subframe level, which includes two aspects: (1) decoding PSCCH and measuring sidelink RSRP (S-RSRP, Sidelink Reference Signal Receiving Power) of PSSCH in a sensing window to exclude improper resource candidates in a selection window; (2) measuring sidelink RSSI (S-RSSI, Sidelink Received Signal Strength indication) to rank resource candidates in the selection window. In the LTE V2X, for example, a UE measures a plurality of S-RSSI values of the PSSCH with 100 ms periodicity and averages these values as the basis to rank a certain resource candidate among multiple candidates within the resource candidate set.

Right now, the 3GPP is going to discuss the design of the physical channel on the sidelink based V2X in NR (New Radio). So far, the discussion of physical resource configuration for the physical sidelink channel in NR is still in a very initial phase and how to allocate the physical channel resource for the sidelink is unclear.

SUMMARY

One non-limiting and exemplary embodiment facilitates determining the physical resource configuration for the physical sidelink channel in NR to support flexible transmission or reception timing of the UE and to improve the system performance.

In a first general aspect of the present disclosure, there is provided a user equipment (UE), comprising: circuitry which, in operation, determines a Transmission Time Interval (TTI) assigned for transmitting or receiving a physical sidelink channel in a carrier; and a transceiver which, in operation, transmits or receives the physical sidelink channel based on the TTI in the carrier, wherein the duration of the TTI is less than a slot duration.

In a second general aspect of the present disclosure, there is provided a wireless communication method for a user equipment, comprising: a TTI assigned for transmitting or receiving a physical sidelink channel in a carrier is determined, and the physical sidelink channel is transmitted or received based on the TTI in the carrier, wherein the duration of the TTI is less than a slot duration.

In a third general aspect of the present disclosure, there is provided a base station, comprising: circuitry which, in operation, generates a configuration signal indicating a time domain resource for transmitting or receiving a physical sidelink channel in a carrier; and a transmitter which, in operation, transmits the configuration signal to a user equipment, wherein a TTI assigned for transmitting or receiving the physical sidelink channel in the carrier is determined by the user equipment based on the configuration signal, in which the duration of the TTI is less than a slot duration.

In a fourth general aspect of the present disclosure, there is provided a wireless communication method for a base station, comprising: a configuration signal indicating a time domain resource for transmitting or receiving a physical sidelink channel in a carrier is generated; and the configuration signal is transmitted to a user equipment, wherein a TTI assigned for transmitting or receiving the physical sidelink channel in the carrier is determined by the user equipment based on the configuration signal, in which the duration of the TTI is less than a slot duration.

It should be noted that general or specific embodiments may be implemented as a UE, a base station, a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
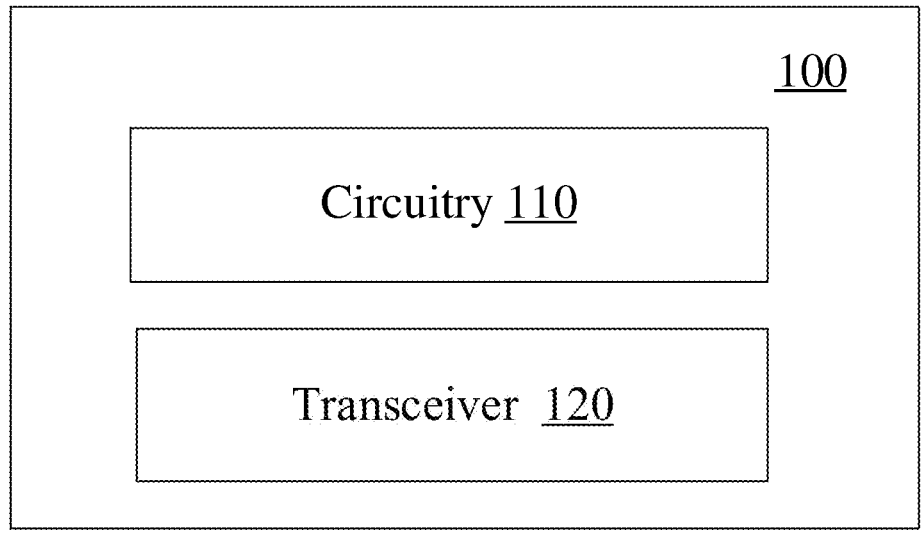
FIG. 1 illustrates a block diagram of a part of a user equipment according to an embodiment of the present disclosure.

In the following detailed description, reference is made to the accompanying drawings, which form a part of this disclosure. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

In the NR, one frame can be subdivided into ten subframes, but different from the LTE, each subframe consists of a given number of slots (1, 2, 4, 8, 16). Each slot consists of a given number of OFDM symbols in the time domain (12 or 14 symbols). The transmission and/or reception of the data and control information is performed on a TTI basis in the time domain.

According to the present disclosure, a shortened TTI is supported for the NR physical sidelink channel. In this case, the physical resource allocation is very flexible, for example, the TTI can start at any position with any duration in a slot. However, for the NR physical sidelink channel, to support flexible transmission timing (e.g., starting position) and format (e.g., duration, DMRS pattern) of a TTI is quite challenging to receiver because there are too many possibilities to decode PSCCH/PSSCH. Based on this consideration, the present disclosure also proposes the features of the duration of a TTI of the sidelink transmission and/or reception being less than a slot duration, and the starting position and/or duration of the TTI being configured, preconfigured or specified depending on different use cases. The different use cases include but not limited to supporting larger coverage and supporting low latency.

The embodiments herein disclosed are applicable to V2X (Vehicle to anything) that includes but not limited to V2I (vehicle to infrastructure), V2P (vehicle to pedestrian), V2V (vehicle to vehicle), and any other communication using NR sidelink.

In an embodiment of the present disclosure, there is provided a user equipment as shown in FIG. 1. FIG. 1 illustrates a block diagram of a part of a user equipment (UE) according to an embodiment of the present disclosure. As shown in FIG. 1, the UE 100 may include circuitry 110 and a transceiver 120. The circuitry 110 determines a TTI assigned for transmitting and/or receiving a physical sidelink channel in a carrier. The transceiver 120 transmits and/or receives the physical sidelink channel based on the determined TTI in the carrier. According to the present disclosure, the duration of the TTI is less than a slot duration.

According to an embodiment of the present disclosure, the phrase "TTI" and/or "slot" refers to the resource assigned for sidelink transmission and/or reception in the NR, which is not limit of the present disclosure, and can be replaced with other phrases such as "resource", "time resource", etc.

Figure 2:
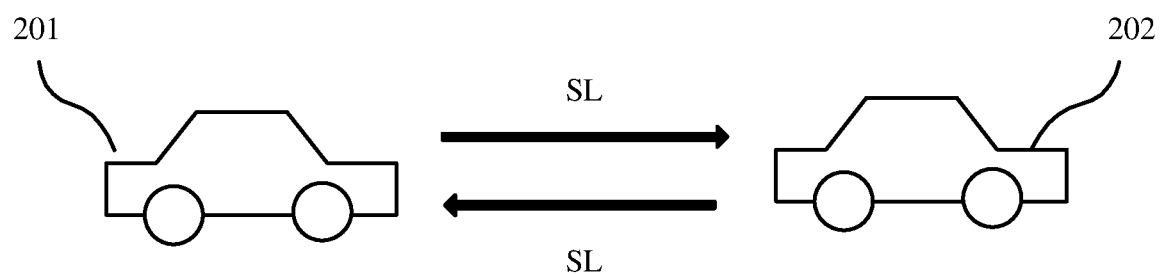
FIG. 2 illustrates an exemplary scenario of sidelink communication in NR.

FIG. 2 illustrates an exemplary scenario of sidelink communication in NR. As shown in FIG. 2, the communication may be performed between two vehicles 201 and 202 via sidelink as shown by two thick arrows noted as "SL". The UE 100 shown in FIG. 1 may be used as the vehicle 201, and another UE with the same function as the UE 100 may be used as the vehicle 202, and vice versa.

For example, the vehicle 201 may determine a TTI assigned for transmitting or receiving a physical sidelink channel in a carrier, then it may transmit a sidelink signal in the TTI in the carrier to the vehicle 202. Here, the sidelink signal transmitted from the UE 100 (e.g. the vehicle 201) to the other UE (e.g. the vehicle 202) could be a control channel like Physical Sidelink Control Channel (PSCCH), a data channel like Physical Sidelink Shared Channel (PSSCH), a Demodulation Reference Signal (DMRS), or a synchronization channel like Physical Sidelink Broadcast Channel (PSBCH) and/or Primary Sidelink Synchronisation Signal (PSSS), for example. Also, the vehicle 201 may receive the sidelink signal from the vehicle 202 based on the determined TTI.

Figure 3:
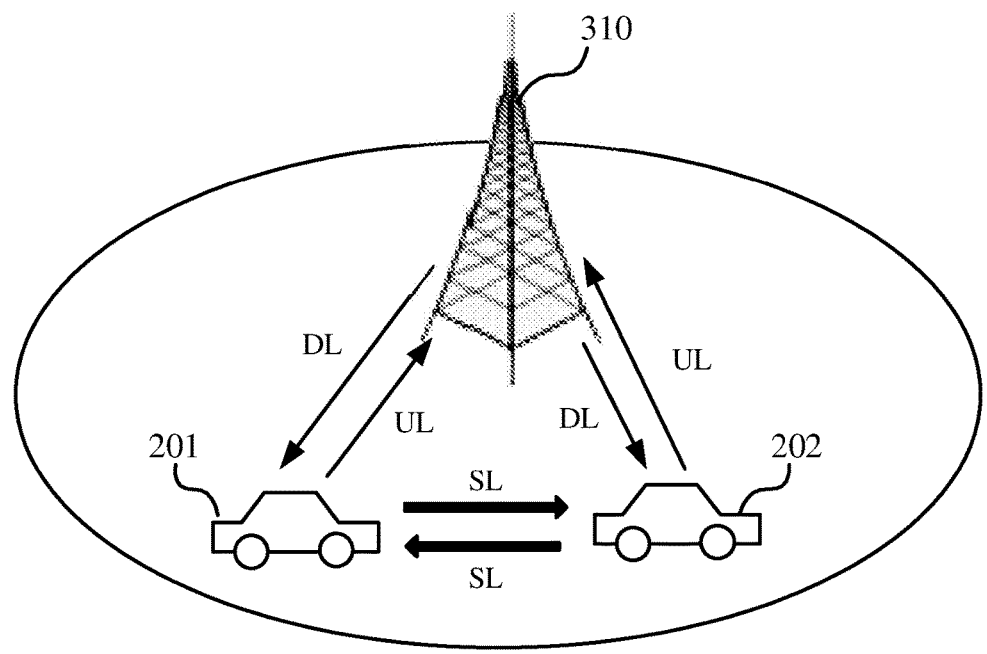
FIG. 3 illustrates another exemplary scenario of sidelink communication in NR.

FIG. 3 illustrates another exemplary scenario of sidelink communication in NR. Similarly with FIG. 2, in FIG. 3, the communication may be performed between two vehicles 201 and 202 via sidelink as shown by two thick arrows noted as "SL", and the UE 100 shown in FIG. 1 may be used as the vehicle 201, and another UE with the same function as the UE 100 may be used as the vehicle 202, and vice versa. For the purpose of avoiding redundancy, the same contents as that in FIG. 2 will not be described in details again. Different from FIG. 2, in FIG. 3, there further is a base station (BS, gNB) 310, and the two vehicles 201 and 202 are both in the coverage of the BS 310. Uu communication may also be performed between the BS 310 and each of the two vehicles 201 and 202 as shown by respective arrows noted as "DL" or "UL". Here, "DL" indicates downlink, and "UP" indicates uplink. That is, the sidelink communication and the Uu communication may coexist in NR. The signaling transmitted via Uu can control the transmission of sidelink. The embodiment of the present disclosure as shown in FIG. 1 can be applied to both scenarios shown in FIG. 2 and FIG. 3.

It can be specified in the NR standard specifications that the duration of a TTI is less than a slot duration for the physical sidelink channel. However, the present disclosure is not limited thereto. It also can be configured or preconfigured by signaling that the duration of a TTI is less than a slot duration for the physical sidelink channel. For example, when the UE 100 is in coverage of a base station, the UE 100 may receive a configuration signal which configures that the duration of a TTI is less than a slot duration for the physical sidelink channel from the base station, and the configuration signal can be DCI, MAC CE or RRC signaling. In contrast, when the UE 100 is out of the coverage of any base station, it is possible to preconfigure that the duration of a TTI is less than a slot duration for the physical sidelink channel for example via the signaling which is set and/or stored in advance in the UE 100.

With the UE 100 as shown in FIG. 1, since the duration of a TTI is less than a slot duration for the physical sidelink channel, the flexibility of physical resource configuration is improved.

According to one embodiment of the present disclosure, the starting position and/or duration of the TTI in a slot is configured, preconfigured or specified depending on different use case, in which the physical channel of NR sidelink is categorized into two modes such as Mode A and Mode B. For example, Mode A can be targeted for large coverage, in which a long TTI duration is supported, and/or both the front-loaded DMRS and additional DMRS are always present. For example, the Mode B can be targeted for low latency of the physical channel, in which a short TTI duration is supported, and/or only the front-loaded DMRS present. The duration of the sensing window and/or the resource selection window can be determined according to the duration of the long TTI or the short TTI or both of them.

Figure 4:
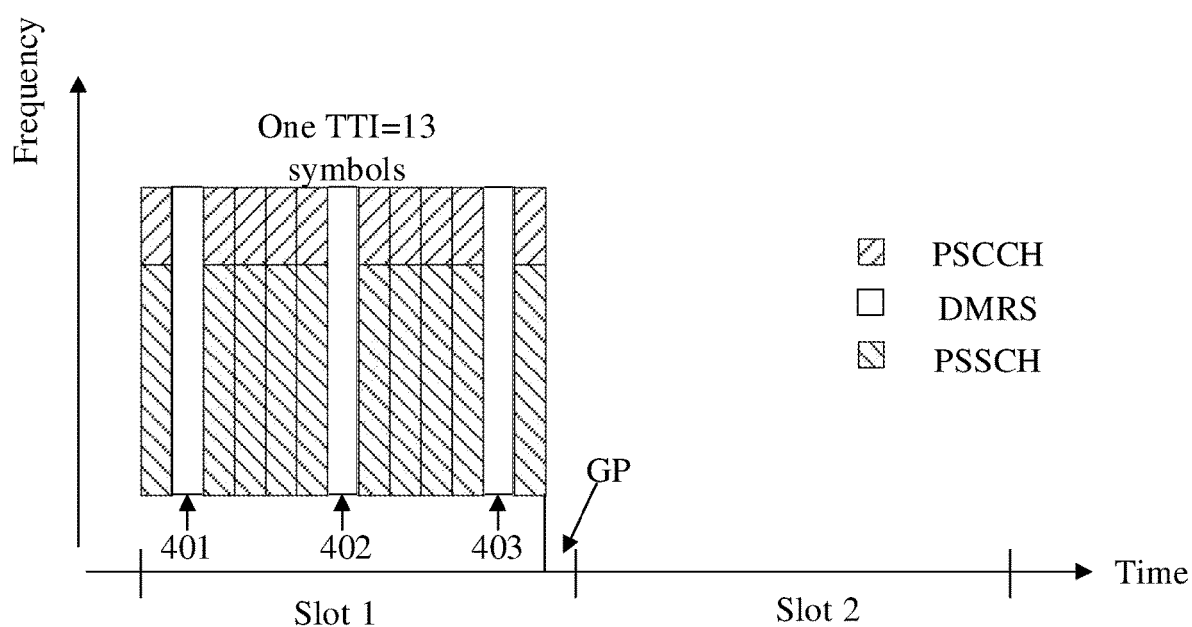
FIG. 4 illustrates an exemplary scenario of a TTI assigned for transmitting or receiving physical sidelink channel according to an embodiment of the present disclosure.

FIG. 4 illustrates an exemplary scenario of a TTI assigned for transmitting and/or receiving a physical sidelink channel according to an embodiment of the present disclosure. In FIG. 4, the horizontal axis represents time, and vertical axis represents frequency. In the time direction, two slots such as "slot 1" and "slot 2" are shown, and each slot may include 14 OFDM symbols. In the frequency direction, the frequency resource consists of a plurality of subcarriers. The area formed by crossing of each OFDM symbol and each subcarrier is referred to as a resource element (not specifically shown in the figures), which is the least element of a physical resource that can be assigned for the sidelink communication. In FIG. 4, the physical resources indicated by right slash represent PSCCH, the physical resources indicated by left slash represent PSSCH, and the physical resources indicated by blank block represent DMRS.

As shown in FIG. 4, according to an embodiment of the present disclosure, a TTI assigned for transmitting and/or receiving the physical sidelink channel is configured to be less than a slot duration. For example, the TTI in the slot 1 includes 13 OFDM symbols that are less than the whole 14 OFDM symbols included in the slot, and the TTI starts from the first symbol of the slot 1, and the last symbol of the slot 1 is reserved for a guard period (GP) handling. In the FIG. 4, only the TTI included in slot 1 is shown as an example, but a situation of the TTI included in slot 2 is not shown.

According to one embodiment of the present disclosure, the TTI that includes 13 symbols can be defined as a long TTI duration. However, the embodiment of the present disclosure does not limit to this condition. The long TTI duration can also be defined as including a plurality of OFDM symbols in which the number of the OFDM symbols is equal to or more than a threshold value. The long TTI duration is targeted for the use case of supporting the larger coverage, and it can also be referred to as the TTI Mode A or TTI Model.

According to one embodiment of the present disclosure, the threshold value may be equal to any one of 5, 6, 7, 8, 9, and 10. For example, when the threshold is equal to 6, the TTI that includes 6 or more OFDM symbols is called as the long TTI duration. The specific threshold value for determining whether a TTI has a long duration or a short duration can be specified in the NR standard specification. However, the present disclosure is not limited thereto. According to another embodiment of the present disclosure, the specific threshold value can be configured or preconfigured by signaling. For example, the UE 100 may receive a configuration signal, from a base station, that can notify the UE 100 of the specific threshold value for determining whether a TTI has a long duration or a short duration. The configuration signal can be DCI, MAC CE or RRC signaling.

According to one embodiment of the present disclosure, both the front-loaded DMRS signals and additional DMRS signals are transmitted in the long TTI duration, in which the front-loaded DMRS signals are transmitted on the second OFDM symbol of the long TTI duration, and the additional DMRS signals are transmitted on other OFDM symbols after the second OFDM symbol. As shown in FIG. 4, DMRS 401 are the front-loaded DMRS signals that are transmitted on the second OFDM symbol. The first symbol of the slot cannot be used for transmitting the DMRS signals, since the first symbol is used for potential AGC handling. In the long TTI duration, additional DMRS signals are transmitted too. As shown in FIG. 4, DMRS 402 and DMRS 403 can be transmitted in the long TTI duration. The positions of transmitting DMRS 402 and DMRS 403 can be flexibly configured in the long TTI, for example, the positions of transmitting the additional DMRS are on any other OFDM symbols after the second OFDM symbol. The positions of transmitting DMRS can be configured or indicated in downlink control information (DCI) received from upper layer.

The TTI duration that includes less symbols can be defined as a short TTI duration. For example, the short TTI duration includes at least one OFDM symbols but the number of the OFDM symbols is less than a threshold value. The short TTI duration is targeted for the use case of supporting the low latency, and it can also be referred to as the TTI Mode B or TTI Mode 2.

According to one embodiment of the present disclosure, the threshold value is equal to any one of 5, 6, 7, 8, 9, and 10. For example, when the threshold is equal to 6, the TTI duration that includes 5 or less OFDM symbols is called as the short TTI duration. The specific threshold value for determining whether a TTI has a long duration or a short duration can be specified in the NR standard specification. However, the present disclosure is not limited thereto. According to another embodiment of the present disclosure, the specific threshold value can be configured or preconfigured by signaling. For example, the UE 100 may receive a configuration signal, from a base station, that can notify the UE 100 of the specific threshold value for determining whether a TTI has a long duration or a short duration. The configuration signal can be DCI, MAC CE or RRC signaling.

Figure 5:
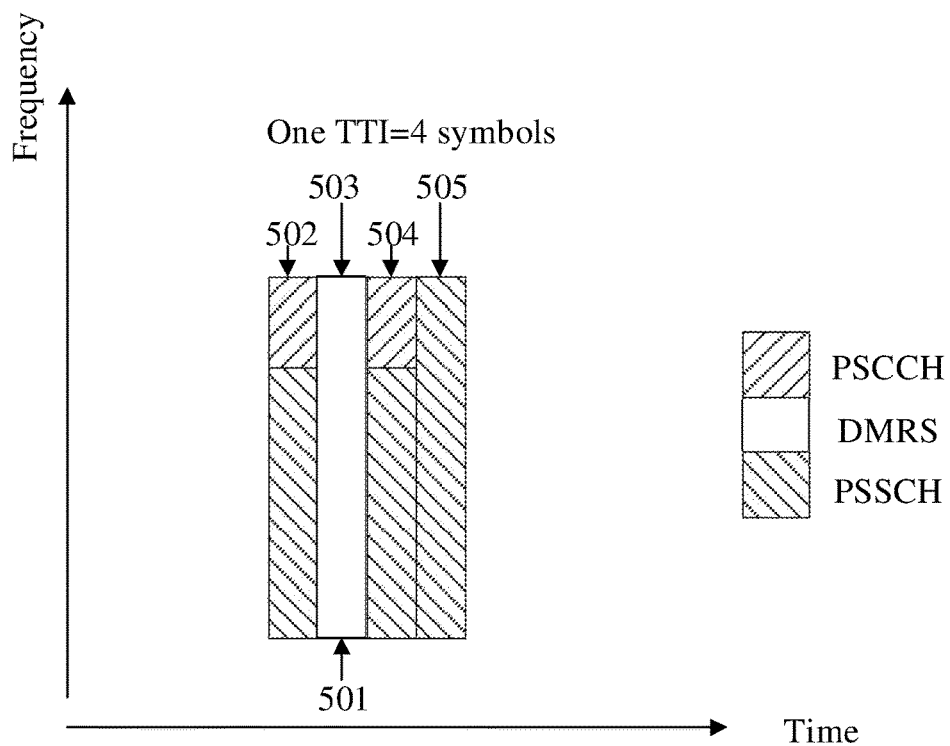
FIG. 5 illustrates another exemplary scenario of a TTI assigned for transmitting or receiving physical sidelink channel according to an embodiment of the present disclosure.

FIG. 5 illustrates another exemplary scenario of a TTI assigned for transmitting and/or receiving the physical sidelink channel according to an embodiment of the present disclosure. In FIG. 5, the TTI duration includes 4 OFDM symbols that is a short TTI duration.

According to one embodiment of the present disclosure, only the front-loaded DMRS signals are transmitted on the second OFDM symbol of the short TTI duration without additional DMRS signal transmitted. Specifically as shown in FIG. 5, DMRS 501 are the front-loaded DMRS signals that are transmitted on the second OFDM symbol of the TTI. In the short TTI duration, no additional DMRS signals can be transmitted. The first symbol cannot be used for transmitting the DMRS signals, since the first symbol is used for potential AGC handling. In whatever the mode A or the mode B, the front-loaded DMRS is located in the second symbol of the TTI since potential handling on AGC at the first symbol.

Figure 6:
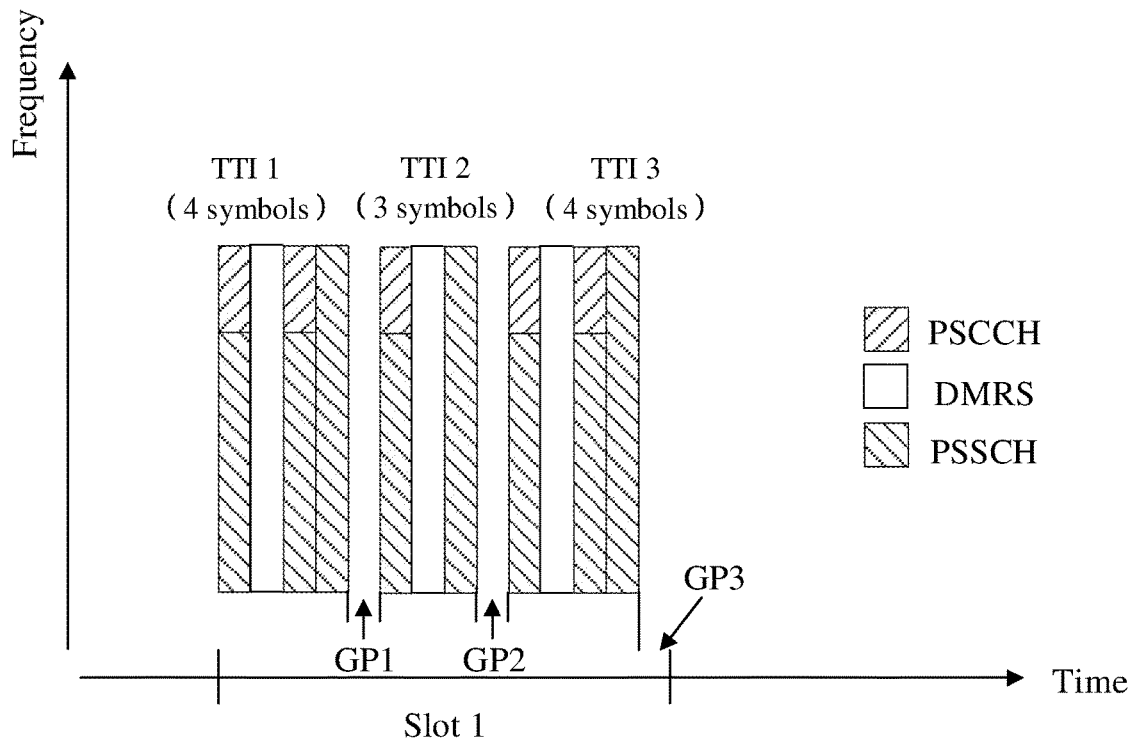
FIG. 6 illustrates a further exemplary scenario of a TTI assigned for transmitting or receiving physical sidelink channel according to an embodiment of the present disclosure.

FIG. 6 illustrates a further exemplary scenario of a TTI assigned for transmitting and/or receiving the physical sidelink channel according to an embodiment of the present disclosure. In FIG. 6, the slot 1 includes 3 short TTIs. The duration of the first short TTI (TTI 1) includes 4 OFDM symbols, and it starts from the first symbol in the slot 1. The duration of the second short TTI (TTI 2) includes 3 OFDM symbols, and it starts from the sixth symbol in the slot 1. The duration of the third short TTI (TTI 3) includes 4 OFDM symbols, and it starts from the tenth symbol in the slot 1. The OFDM symbols that are located between two TTIs and the last OFDM symbol of the slot 1 are reserved for a guard period (GP) handling, as indicated by GP1, GP2, and GP3 respectively.

According to the embodiments of the present disclosure, a slot includes at least one TTIs, such as the TTI as shown in FIG. 4 and the three TTIs as shown in FIG. 6. Each of the TTI includes one or more OFDM symbols, in which the first TTI duration starts from the first OFDM symbol of the slot, and the OFDM symbol immediately after each of the TTI durations is reserved for a guard period (GP) handling. The guard period is used for avoiding from adverse impact of the physical channel propagation latency. Since GPs may be set between respective TTIs, the starting position and/or the duration of each TTI should be configured, preconfigured or specified depending on the presence of the GPs.

According to another embodiment of the present disclosure, the TTI duration includes at least two OFDM symbols in case of DFT-S-OFDM, since DMRS signals need to be transmitted on one symbol.

According to the above embodiments of the present disclosure, the additional DMRS signals are transmitted in the long TTI duration, but not in the short TTI duration. In case of DFT-S-OFDM, since DMRS signals need to be transmitted on one OFDM symbol, a TTI has to include at least two OFDM symbols, in which the other OFDM symbol is used for transmitting the PSSCH and/or PSCCH. In this case, the starting position and/or the duration of each TTI in a slot should be configured, preconfigured or specified depending on the presence of DMRS and/or whether the additional DMRS is transmitted.

According to one embodiment of the present disclosure, in the TTI duration, the OFDM symbols occupied by PSCCH are less than the OFDM symbols occupied by PSSCH. For example, for each of short TTIs in a slot, the duration of PSCCH is shorter than that of PSSCH in order to reduce the processing time of control channel. As shown in FIG. 5, the TTI duration includes OFDM symbols 502, 503 504 and 505. The OFDM symbols 502 and 504 are occupied by PSCCH, and the OFDM symbols 502, 504, and 505 are occupied by PSSCH, in which the OFDM symbols occupied by PSCCH are less than the OFDM symbols occupied by PSSCH. According to another embodiment of the present disclosure, the feature of the OFDM symbols occupied by PSCCH being less than the OFDM symbols occupied by PSSCH is also applied to the long TTI in the slot.

According to one embodiment of the present disclosure, the PSCCH and the PSSCH are Frequency Division Multiplexed (FDMed) within the same OFDM symbols in the carrier. As shown in FIG. 5, in the OFDM symbol 502, the PSCCH occupies a part of frequency band, and the PSSCH occupies another part of frequency band, they are Frequency Division Multiplexed (FDMed) within the same OFDM symbol 502. According to another embodiment of the present disclosure, the feature of the PSCCH and the PSSCH being Frequency Division Multiplexed (FDMed) within the same OFDM symbols in the carrier is applied to both the long TTI and the short TTI.

Figure 7:
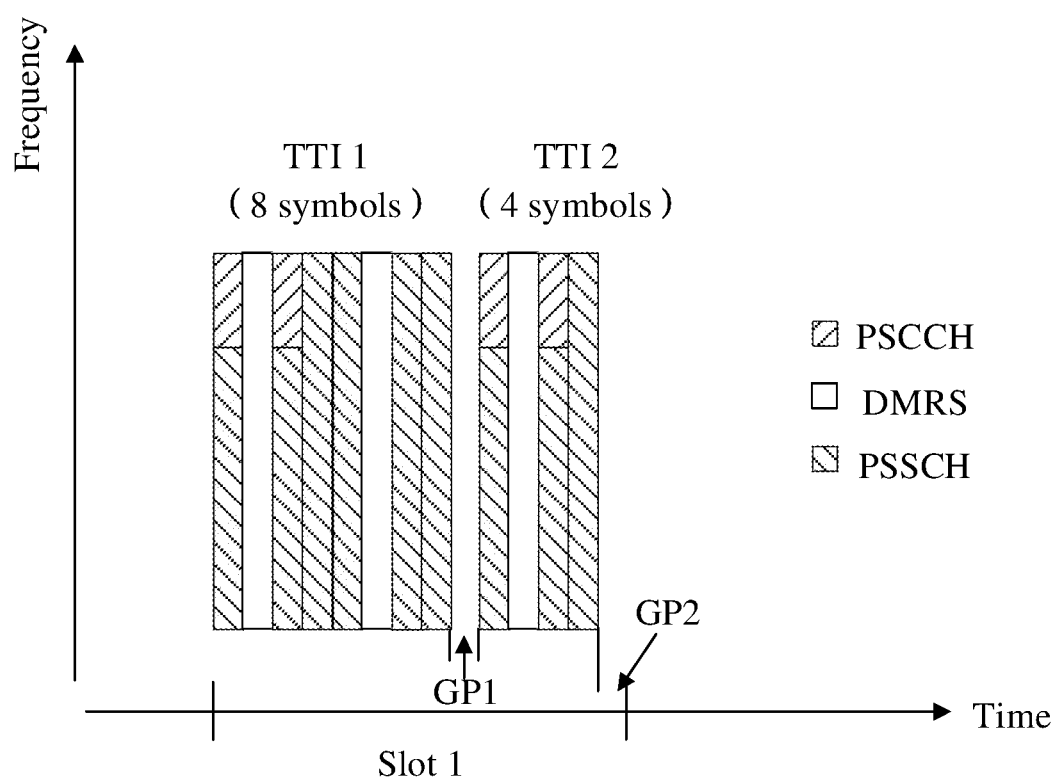
FIG. 7 illustrates another further exemplary scenario of a TTI assigned for transmitting or receiving physical sidelink channel according to an embodiment of the present disclosure.

According to one embodiment of the present disclosure, the OFDM symbols in different TTIs within the slot are orthogonal in time domain. FIG. 7 illustrates another further exemplary scenario of a TTI assigned for transmitting and/or receiving the physical sidelink channel according to an embodiment of the present disclosure. In FIG. 7, the slot includes 2 TTIs such as TTI 1 and TTI 2, in which the TTI 1 is a long TTI duration, and the TTI 2 is a short TTI duration. The OFDM symbol that is located between the two TTIs and the last OFDM symbol of the slot are reserved for guard period (GP) handling, as indicated by GP1 and GP2 respectively. According to another embodiment of the present disclosure, the feature of the OFDM symbols in different TTIs within the slot being orthogonal in time domain is applied to both the long TTI and the short TTI.

As shown in FIG. 7, in the long TTI duration "TTI 1", there are included 8 OFDM symbols. In the short TTI duration "TTI 2", there are included 4 OFDM symbols. According to one embodiment of the present disclosure, the OFDM symbols in the long TTI duration "TTI 1" and the OFDM symbols in the short TTI duration "TTI 2" are orthogonal in time domain. The starting position and/or the duration of each TTI should be configured, preconfigured or specified depending on whether the TTIs are orthogonal in timing domain.

According to one embodiment of the present disclosure, the duration of a resource selection window and/or the duration of signal sensing window are determined according to the duration of the TTI. For the TTI mode A and the mode B, different resource selection windows for the TTI with a long duration and the TTI with a short duration are used. For transmission with a long duration, longer selection window is used, and for transmission with a short duration, shorter selection window is used. But for both mode A and mode B, both the TTI with a long duration and the TTI with a short duration need to be sensed. The sensing window for the TTI with a long duration and the TTI with a short duration could be the same or different on the size. For example, for transmission of the TTI with a short duration, shorter sensing window is used compared with that of the TTI with a long duration.

According to another exemplary embodiment of the present disclosure, a TTI with duration larger than a threshold value is sensed in the sensing window for transmission of TTI with a long duration. That is, only TTI with a long duration and TTI with a duration which is larger than certain threshold need to be sensed for transmission of TTI with a long duration. For example for transmission of a TTI with 13 symbols, TTI with 2 or 3 symbols need not be sensed as the interference caused by 2 or 3 symbols could be ignored by transmission of the TTI with 13 symbols.

Table 1 in the following shows more examples as NR sidelink only supports three durations of TTI: 2 symbols, 7 symbols and 14 symbols.

TABLE 1

| TTI duration for resource selection | TTI durations that need to be monitored in sensing window |
|---|---|
| 14 symbols | 14 symbols, 7 symbols Note: 2 symbol slot is ignored due to small impact to 14-symbol slot |
| 7 symbols | 14 symbols, 7 symbols Note: 2 symbol slot is ignored due to small impact to 7-symbol slot |
| 2 symbols | 14 symbols, 7 symbols, 2 symbols |

In Table 1 as shown above, whether a TTI duration is monitored in the sensing window is based on TTI duration transmitted in the resource selection window. For example, if the TTI duration transmitted in the resource selection window is 2 symbols, all the TTIs with 14 symbols, 7 symbols, and 2 symbols are monitored in the sensing window. If the TTI duration transmitted in the resource selection window is 7 or 14 symbols, the TTI with 2 symbols is ignored in the sensing window.

Figure 8:
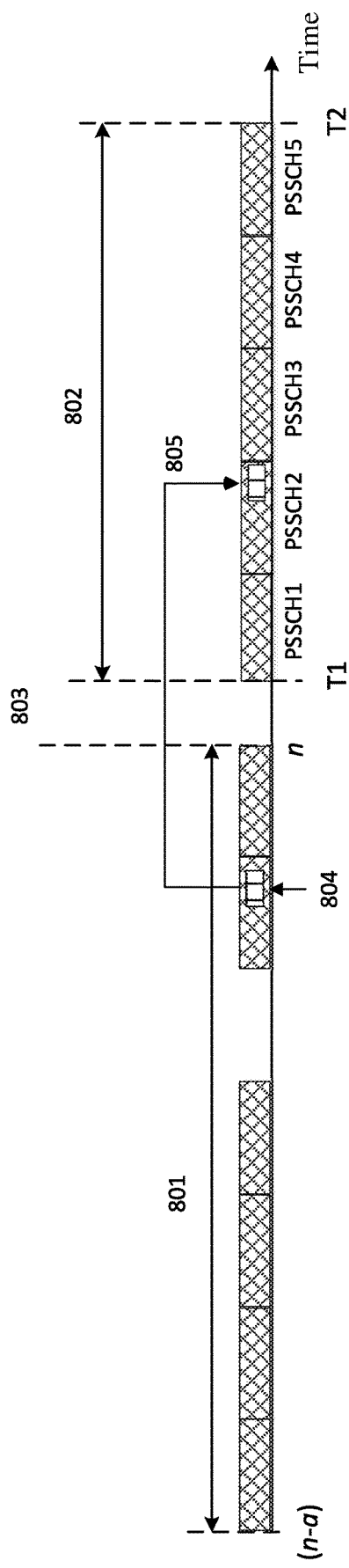
FIG. 8 illustrates an exemplary scenario of signal sensing and resource selection operation for receiving and transmitting the physical sidelink channel according to an embodiment of the present disclosure.

FIG. 8 illustrates an exemplary scenario of signal sensing and resource selection operation for the physical sidelink channel according to an embodiment of the present disclosure. In FIG. 8, there are shown a sensing window 801 and a resource selection window 802. The sensing window 801 is from the timing "n-a" to the timing "n", and in the sensing window 801, the long TTI and the short TTI may need to be sensed, which is based on the TTI length of the resource candidate transmitted in the resource selection window 802, as described above. When the short TTI is included in the sensing window 801, the duration of the sensing window 801 can be shortened, or it can be kept the same without being shortened. After the sensing window 801, the resource selection operation will be triggered (803), and the time and frequency resources used for transmission is selected in the resource selection window 802 based on the sensing result from the sensing window 801. For example, if a PSSCH 804 in a certain TTI is sensed as having a strong interference in the sensing window 801, the UE will remove (805) the resource candidate used for the PSSCH 2 from the resource candidate set in the resource selection window 802, in which the resource candidate used for the PSSCH 2 may be periodically affected by the sensed interference. As shown in FIG. 8, the duration of the resource selection window 802 is long because it is determined based on the TTIs with long duration.

Figure 9:
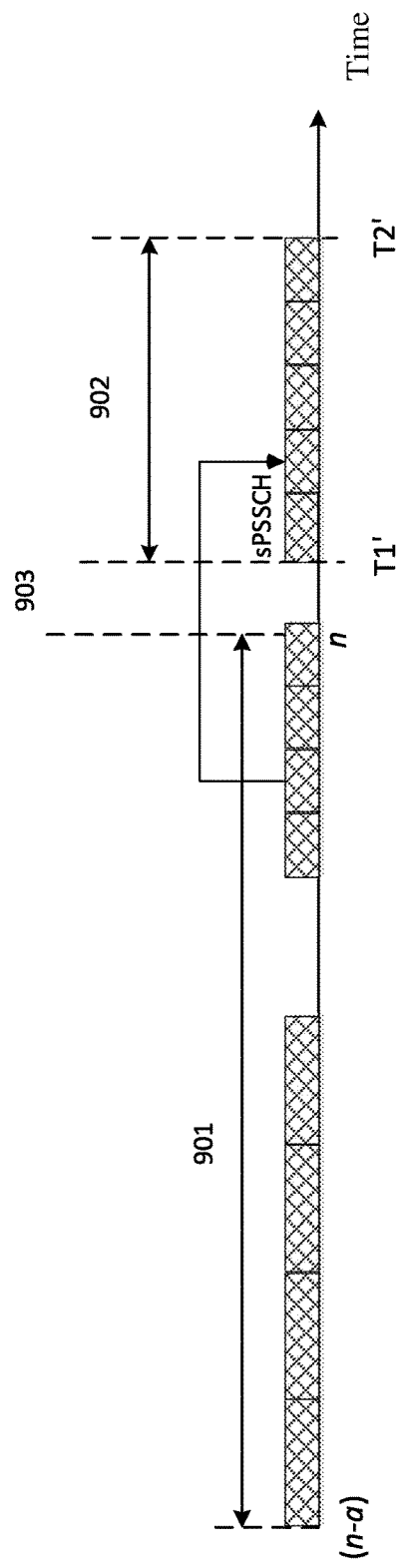
FIG. 9 illustrates another exemplary scenario of signal sensing and resource selection operation for receiving and transmitting the physical sidelink channel according to an embodiment of the present disclosure.

FIG. 9 illustrates another exemplary scenario of signal sensing and resource selection operation for the physical sidelink channel according to an embodiment of the present disclosure. In FIG. 9, there are shown a sensing window 901 and a resource selection window 902. The sensing window 901 is from the timing "n-a" to the timing "n", and in the sensing window 901, the long TTI and the short TTI may need to be sensed, which is based on the TTI length of the resource candidate transmitted in the resource selection window 902, as described above. When the short TTI is included in the sensing window 901, the duration of the sensing window 901 can be shortened, or it can be kept as the same without being shortened. After the sensing window 901, the resource selection operation will be triggered (903), and the time and frequency resources used for transmission is selected in the resource selection window 902 based on the sensing result from the sensing window 901. In FIG. 9, since the TTIs in the resource selection window 902 are the shortened TTIs, the duration of the resource selection window 902 is short. In this situation, the system latency may be decreased and the system performance may be improved.

In the NR, the sensing is operated on TTI level. In another exemplary scenario, ranking candidate resource in selection window is based on the averaged S-RSSI measured in the same TTI duration as that of the resource selection in the sensing window. Table 2 shows more examples.

TABLE 2

| TTI duration for resource selection | TTI duration that used for measuring S-RSSI and rank candidate resources |
|---|---|
| 14 symbols | 14 symbols |
| 7 symbols | 7 symbols |
| 2 symbols | 2 symbols |

In Table 2 as shown above, the TTI duration that is used for measuring S-RSSI in the sensing window is the same as the TTI duration that is used for ranking resource candidate in the resource selection window. For example, if the TTI duration in the resource selection window for ranking resource candidate is 7 symbols, the averaged S-RSSI should be measured in the TTI duration with 7 symbols.

In the above embodiments of the present disclosure, the UE 100 and its operation are described in details with reference to FIGS. 1-9. For the UE 100 used as both transmitter and/or receiver, it transmits and/or receives the long TTI and/or the short TTI based on above embodiments of the present disclosure. For the receiver, the above operation largely reduces the hypothesis of channel format like the duration, the starting position and the DMRS positions of the TTIs, so the complexity of the system is largely reduced.

Figure 10:
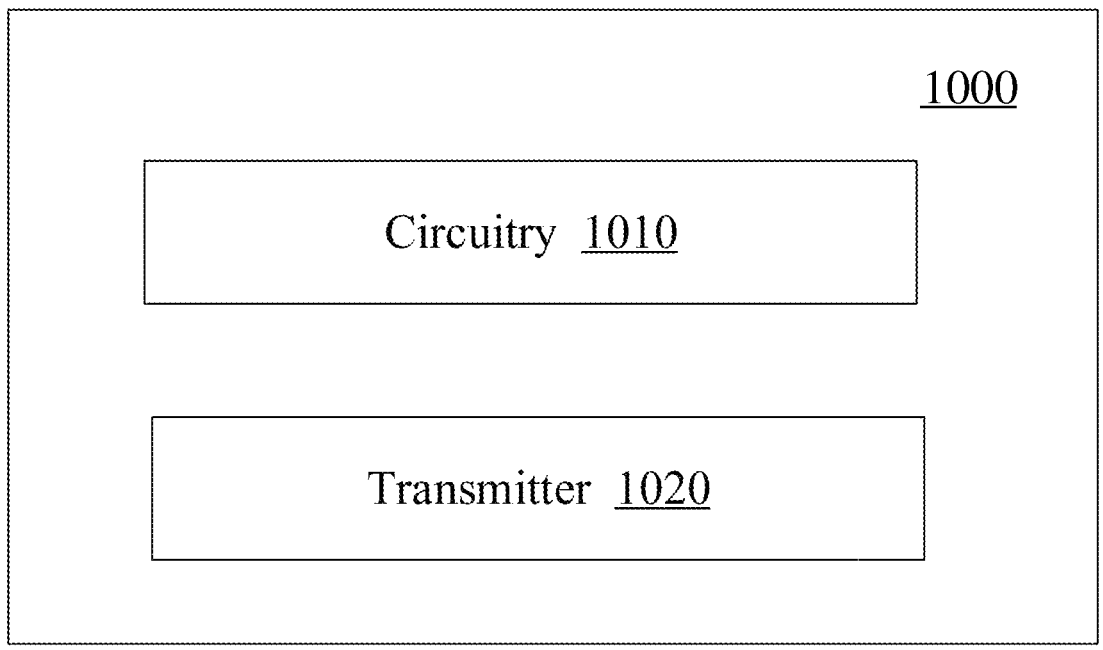
FIG. 10 illustrates a block diagram of a part of a base station according to an embodiment of the present disclosure.

In another embodiment of the present disclosure, there is provided a base station. FIG. 10 illustrates a block diagram of a part of a base station according to an embodiment of the present disclosure. As shown in FIG. 10, the base station 1000 may comprise circuitry 1010 and a transmitter 1020. The circuitry 1010 generates a configuration signal indicating a time domain resource for transmitting and/or receiving a physical sidelink channel in a carrier. The transmitter 1020 transmits the configuration signal to a user equipment. A TTI assigned for transmitting and/or receiving the physical sidelink channel in the carrier is determined by the user equipment based on the configuration signal, in which the duration of the TTI is less than a slot duration.

For example, the base station 1000 may be the base station 310 as shown in FIG. 3, and the user equipment may be the UE 100 as shown in FIG. 1 and the vehicle 201 or 202 as shown in FIG. 2 and FIG. 3. As described above, when the UE 100 in coverage of the base station 1000, the UE 100 may receive the configuration signal from the base station 1000 and determine the TTI assigned for transmitting and/or receiving the physical sidelink channel in the carrier. The configuration signal can be DCI, MAC CE or RRC signaling.

For example, as described above with reference to FIG. 3, the vehicle 201 may perform the Uu communication with the base station 310, and perform the sidelink transmission and/or reception with the vehicle 202.

Figure 11:
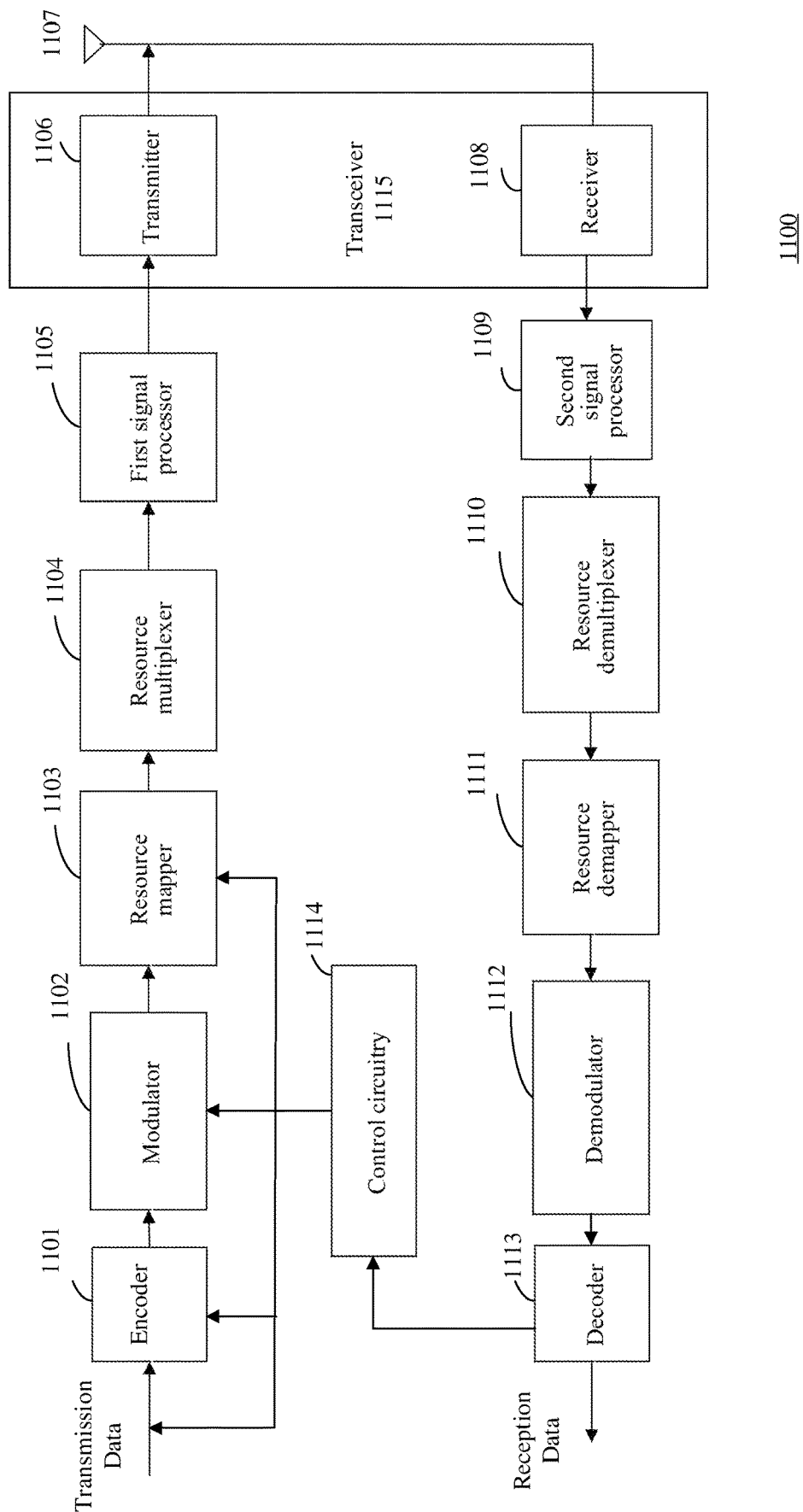
FIG. 11 illustrates a block diagram of details of a user equipment according to an embodiment of the present disclosure.

FIG. 11 illustrates a block diagram of details of a user equipment according to an embodiment of the present disclosure. As shown in FIG. 11, the UE 1100 includes an encoder 1101, a modulator 1102, a resource mapper 1103, a resource multiplexer 1104, a first signal processor 1105, a transmitter 1106, an antenna 1107, a receiver 1108, a second signal processor 1109, a resource demultiplexer 1110, a resource demapper 1111, a demodulator 1112, a decoder 1113 and a control circuitry 1114. According to another embodiment of the present disclosure, the transmitter 1106 and the receiver 1108 can be realized as a transceiver 1115.

For example, the encoder 1101 performs encoding processing on transmission data, and the modulator 1102 performs modulation processing on the encoded transmission data to generate data symbol and control symbol. The resource mapper 1103 maps the data symbol and the control symbol onto physical resources. For example, when the transmission data belongs to the sidelink data to be transmitted to another UE, the resource mapper 1103 maps the data symbol and the control symbol onto physical sidelink channels with the long TTI duration and/or the short TTI duration as determined according to the above embodiments. The resource multiplexer 1104 multiplexes the data symbol, the control symbol, and/or other information such as synchronization information, etc. The first signal processor 1105 performs the signal processing such as up-conversion on the multiplexed signal output from the resource multiplexer 1104. The transmitter 1106 transmits the processed sidelink signal to another UE via the antenna 1107.

Here, the operations of the encoder 1101, the modulator 1102, the resource mapper 1103 and the resource multiplexer 1104 are controlled by the control circuitry 1114. According to another embodiment of the present disclosure, the control circuitry 1114 can control the operations of all other units or modules or circuitries as shown in FIG. 11. For example, the control circuitry 1114 may determine a TTI assigned for transmitting and/or receiving a physical sidelink channel in a carrier. The resource mapper 1103 maps the sidelink data symbol and the sidelink control symbol onto the determined TTIs, and the transmitter 1106 transmits the sidelink signals on the determined TTIs in the carrier to another UE. According to the embodiments of the present disclosure, the duration of the determined TTI is less than a slot duration.

In addition, the receiver 1108 may receive a sidelink signal from another UE via the antenna 1107. The second signal processor 1109 performs the signal processing such as down conversion on the sidelink signal received by the receiver 1108. The resource demultiplexer 1110 demultiplexes the processed sidelink signal into sidelink control symbol and/or sidelink data symbol. The resource demapper 1111 demaps the sidelink control symbol and/or the sidelink data symbol from the physical resources such as TTIs assigned for transmitting and/or receiving the physical sidelink channel in which the duration of the TTI is less than the duration of a slot. The demodulator 1112 performs demodulation processing on the sidelink control symbol and/or the sidelink data symbol, and the decoder 1113 performs decoding processing on the demodulated sidelink control symbol and/or sidelink data symbol to obtain the reception data.

Note that, the user equipment 1100 shown in FIG. 11 may function as UE 100 as shown in FIG. 1. Specifically, the combination of the transmitter 1106 and the receiver 1108 may correspond to the transceiver 120. The circuitry 110 may include the encoder 1101, the modulator 1102, the resource mapper 1103, the resource multiplexer 1104, the first signal processor 1105, the second signal processor 1109, the resource demultiplexer 1110, the resource demapper 1111, the demodulator 1112, the decoder 1113 and the control circuitry 1114. Alternatively, one or more of these units may also be separated from the circuitry 110 depending on specific requirements.

Since the UE 1100 will transmit and/or receive the long TTI and/or the short TTI based on above embodiments of the present disclosure, it largely reduces the hypothesis of channel format like the duration, the starting position and the DMRS positions of the TTIs, so the complexity of the system is largely reduced.

Figure 12:
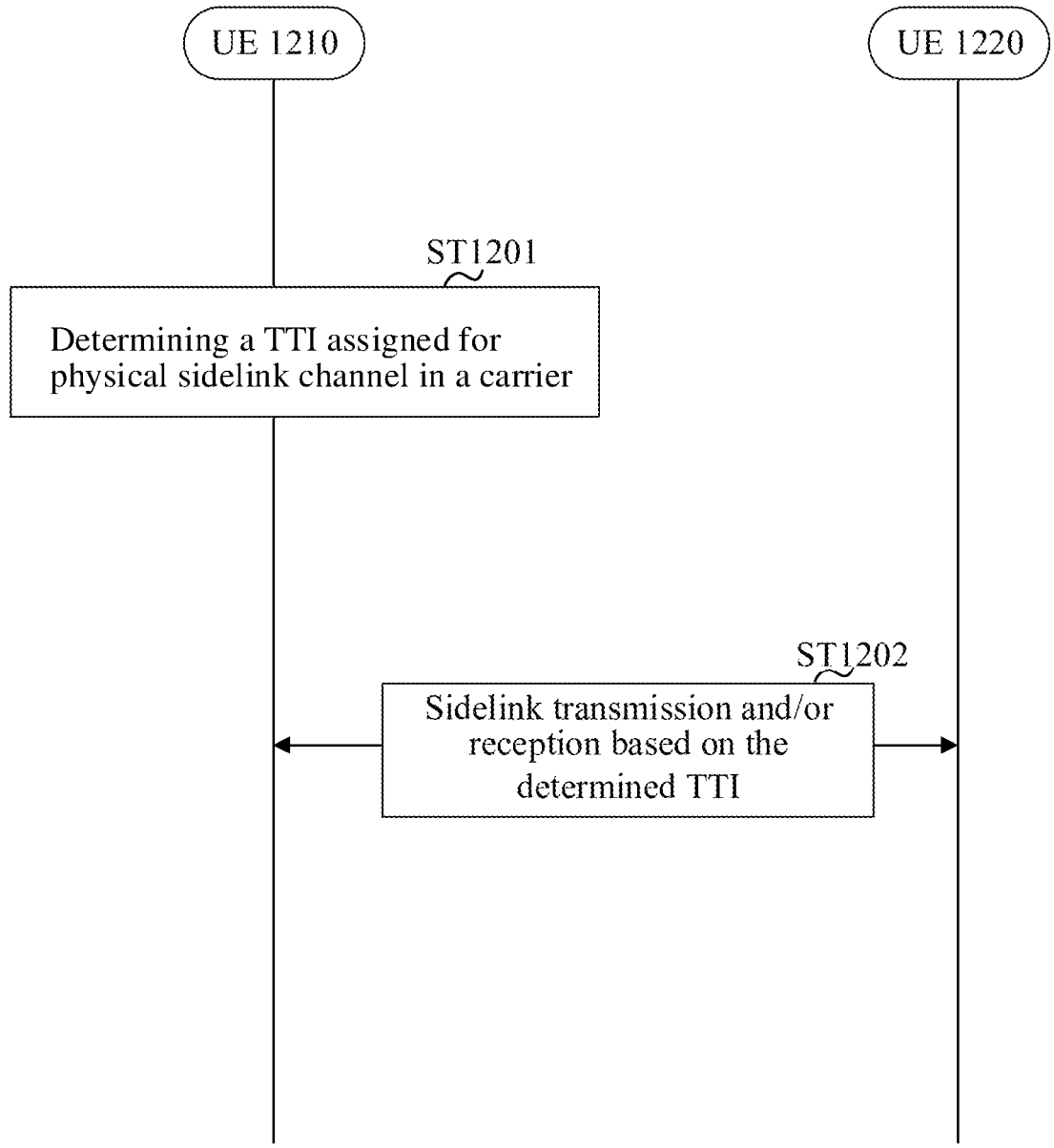
FIG. 12 illustrates an example of a flowchart of communication between two user equipment according to an embodiment of the present disclosure.

FIG. 12 illustrates a flowchart of communication between two UEs according to an embodiment of the present disclosure. For example, both UE 1210 and UE 1220 can be realized as the UE 100 as shown in FIG. 1 or the UE 1100 shown in FIG. 11.

For example, FIG. 12 may correspond to a case that the UEs 1210 and 1220 are out of coverage of any base station, or a case that they are in coverage of a base station, which are similarly as shown in FIG. 2 or FIG. 3. That is to say, the UEs 1210 and 1220 may correspond to the vehicles 201 and 202 shown in FIG. 2 or FIG. 3 respectively.

As shown in FIG. 12, at a step ST1201, the UE 1210 determines a physical sidelink resource. For example, the UE 1210 determines a TTI assigned for transmitting and/or receiving a physical sidelink channel in a carrier, in which the duration of the TTI is less than a slot duration.

At a step ST1202, the UE 1210 and the UE 1220 may perform the sidelink transmission and/or reception between each other based on the determined TTI.

Figure 13:
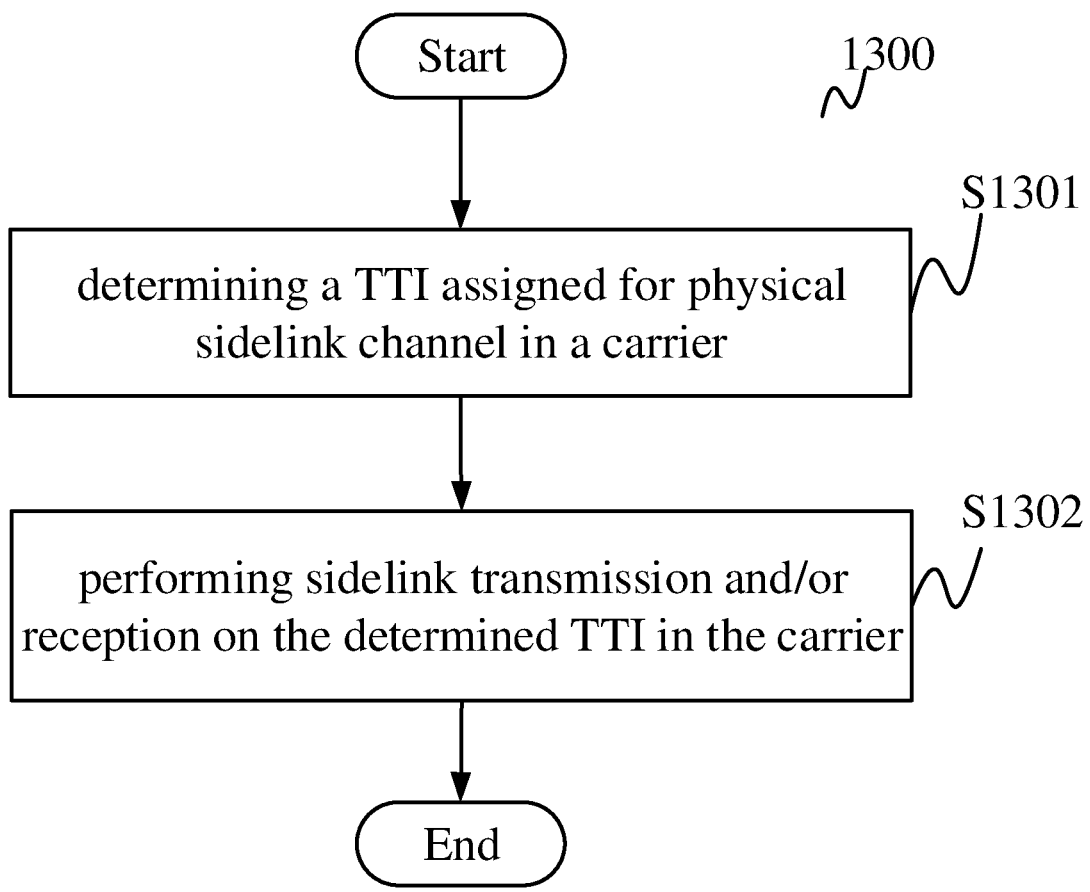
FIG. 13 illustrates a flowchart of a wireless communication method for a user equipment according to an embodiment of the present disclosure.

In a further embodiment of the present disclosure, there is provided a wireless communication method for a user equipment as shown in FIG. 13. FIG. 13 illustrates a flowchart of a wireless communication method for a user equipment according to an embodiment of the present disclosure. For example, the wireless communication method 1300 may be applied to the UE 100/1100 as shown in FIGS. 1 and 11, respectively.

As shown in FIG. 13, the wireless communication method 1300 starts at a step S1301 in which a TTI assigned for transmitting and/or receiving a physical sidelink channel in a carrier is determined. At a step S1302, the sidelink transmission and/or reception is performed based on the determined TTI in the carrier. According to the embodiments of the present disclosure, the duration of the determined TTI is less than a slot duration. After the step S1302, the wireless communication method 1300 is ended. For example, the UEs performing the sidelink transmission and/or reception with each other may be the vehicles 201 and 202 as shown in FIGS. 2 and 3.

Note that, the other technical features in the UE 100 as described above or below can also be incorporated in the wireless communication method 1300 and will not be described here for avoiding redundancy.

With the wireless communication method 1300, for the UE used as both transmitter and receiver, they transmit and/or receive the long TTI and/or the short TTI based on the above embodiments of the present disclosure, the hypothesis of channel format like the duration, the starting position and the DMRS position of the TTIs is largely reduced, so the complexity of the system is largely reduced.

Figure 14:
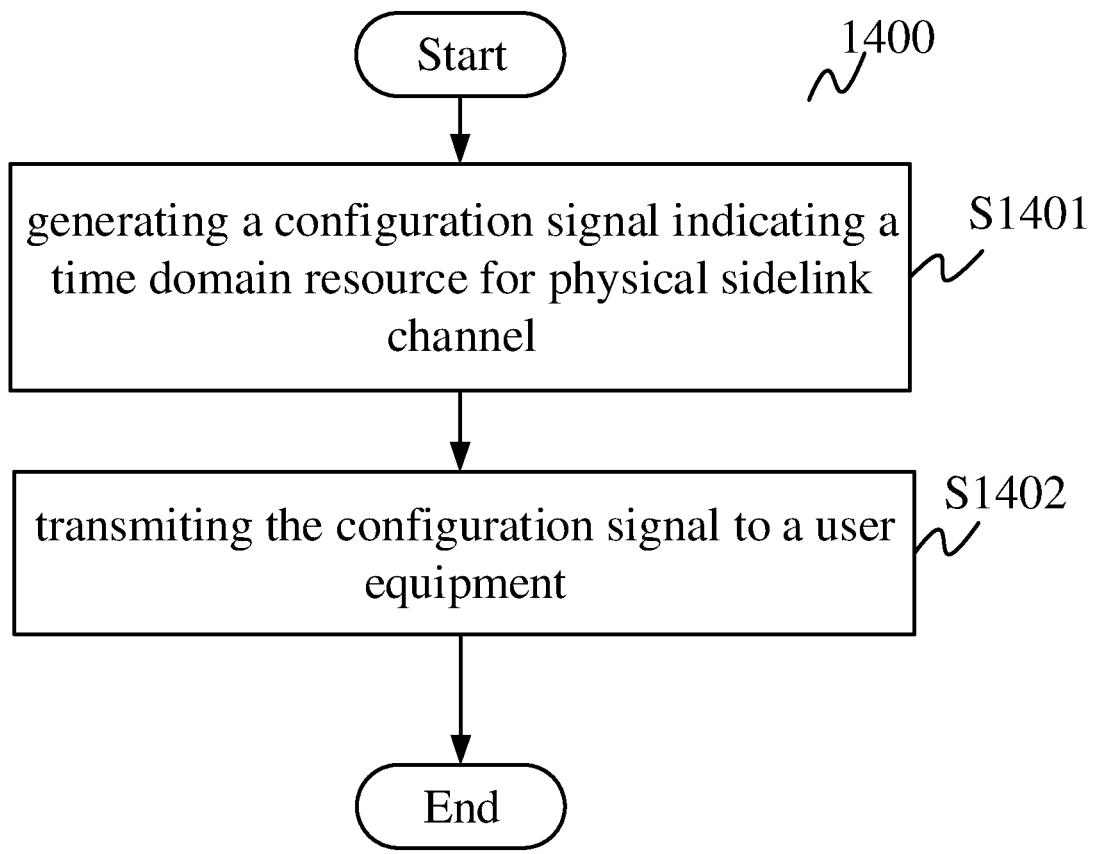
FIG. 14 illustrates a flowchart of a wireless communication method for a base station according to an embodiment of the present disclosure.

In a further embodiment of the present disclosure, there is provided a wireless communication method for a base station as shown in FIG. 14. FIG. 14 illustrates a flowchart of a wireless communication method for a base station according to an embodiment of the present disclosure. For example, the wireless communication method 1400 may be applied to the base station 1000 as shown in FIG. 10.

As shown in FIG. 14, the wireless communication method 1400 starts at a step S1401 in which a configuration signal indicating a time domain resource for transmitting and/or receiving a physical sidelink channel in a carrier is generated. At a step S1402, the configuration signal is transmitted to a user equipment. According to one embodiment of the present disclosure. A TTI assigned for transmitting and/or receiving the physical sidelink channel in the carrier is determined by the user equipment based on the configuration signal, and the duration of the TTI is less than a slot duration. After the step S1402, the wireless communication method 1400 is ended. For example, the user equipment may be the UE 100/1100 as shown in FIGS. 1 and 11.

With the wireless communication method 1400, For the UE used as both transmitter and receiver, they transmit and/or receive the long TTI and/or the short TTI based on the above embodiments of the present disclosure, the hypothesis of channel format like the duration, the starting position and the DMRS position of the TTIs is largely reduced, so the complexity of the system is largely reduced.

Note that, the other technical features in the base station 1000 as described above or below can also be incorporated in the wireless communication method 1400 and will not be described here for avoiding redundancy.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

Embodiments of the present disclosure can at least provide the following subject matters.

1. A user equipment, comprising: circuitry which, in operation, determines a Transmission Time Interval (TTI) assigned for transmitting or receiving a physical sidelink channel in a carrier; and a transceiver which, in operation, transmits or receives the physical sidelink channel based on the TTI in the carrier, wherein the duration of the TTI is less than a slot duration.

2. The user equipment according to 1, wherein the slot duration includes at least one TTIs, each of which includes one or more OFDM symbols, wherein the first TTI duration starts from the first OFDM symbol of the slot, and the OFDM symbol immediately after each of the TTI durations is reserved for a gap.

3. The user equipment according to any one of 1~2, wherein a long TTI duration includes a plurality of OFDM symbols, the number of which is equal to or more than a threshold value.

4. The user equipment according to any one of 1~3, wherein both front-loaded DMRS signals and additional DMRS signals are transmitted in the long TTI duration, in which the front-loaded DMRS signals are transmitted on the second OFDM symbol of the long TTI duration, and the additional DMRS signals are transmitted on other OFDM symbols after the second OFDM symbol.

5. The user equipment according to any one of 1~4, wherein a short TTI duration includes at least one OFDM symbols, the number of which is less than a threshold value.

6. The user equipment according to any one of 1~5, wherein only front-loaded DMRS signals are transmitted on the second OFDM symbol of the short TTI duration without additional DMRS signal transmitted.

7. The user equipment according to any one of 1~6, wherein in the TTI, the OFDM symbols occupied by PSCCH are less than the OFDM symbols occupied by PSSCH.

8. The user equipment according to any one of 1~7, wherein the PSCCH and the PSSCH are Frequency Division Multiplexed (FDMed) within the same OFDM symbols in the carrier.

9. The user equipment according to any one of 1~8, wherein the duration of a resource selection window and/or duration of sensing window is determined according to the duration of the TTI.

10. The user equipment according to 9, wherein the TTI with a duration larger than a threshold value is sensed in the sensing window for transmission of TTI with a long duration.

11. The user equipment according to 9, wherein the TTI duration that is used for measuring S-RSSI in the sensing window is the same as the TTI duration that is used for ranking resource candidate in the resource selection window.

12. The user equipment according to any one of 1~11, wherein the OFDM symbols in different TTIs within the slot are orthogonal in time domain.

13. The user equipment according to any one of 1~12, wherein the TTI duration includes at least two OFDM symbols in case of DFT-S-OFDM.

14. The user equipment according to any one of 1~13, wherein the threshold value is equal to one of 5, 6, 7, 8, 9, 10.

15. A wireless communication method for a user equipment, comprising: determining a Transmission Time Interval (TTI) assigned for transmitting or receiving a physical sidelink channel in a carrier; and transmitting or receiving the physical sidelink channel based on the TTI in the carrier, wherein the duration of the TTI is less than a slot duration.

16. The wireless communication method according to 15, wherein the slot duration includes at least one TTIs, each of which includes one or more OFDM symbols, wherein the first TTI duration starts from the first OFDM symbol of the slot, and the OFDM symbol immediately after each of the TTI durations is reserved for a gap.

17. The wireless communication method according to any one of 15~16, wherein a long TTI duration includes a plurality of OFDM symbols, the number of which is equal to or more than a threshold value.

18. The wireless communication method according to any one of 15~17, further comprising: transmitting front-loaded DMRS signals on the second OFDM symbol of a long TTI duration, and the additional DMRS signals on other OFDM symbols after the second OFDM symbol.

19. The wireless communication method according to any one of 15~18, wherein a short TTI duration includes at least one OFDM symbols, the number of which is less than the threshold value.

20. The wireless communication method according to any one of 15~19, further comprising: transmitting only front-loaded DMRS signals on the second OFDM symbol of the short TTI duration without additional DMRS signal transmitted.

21. The wireless communication method according to any one of 15~20, wherein in the TTI, the OFDM symbols occupied by PSCCH are less than the OFDM symbols occupied by PSCCH.

22. The wireless communication method according to any one of 15~21, wherein the PSCCH and the PSSCH are Frequency Division Multiplexed (FDMed) within the same OFDM symbols in the carrier.

23. The wireless communication method according to any one of 15~22, further comprising: determining the duration of a resource selection window and/or duration of a sensing window according to the duration of the TTI.

24. The wireless communication method according to 23, wherein the TTI with a duration larger than a threshold value is sensed in the sensing window for transmission of TTI with a long duration.

25. The wireless communication method according to 23, wherein the TTI duration that is used for measuring S-RSSI in the sensing window is the same as the TTI duration that is used for ranking resource candidate in the resource selection window.

26. The wireless communication method according to any one of 15~25, wherein the OFDM symbols in different TTIs within the slot are orthogonal in time domain.

27. The wireless communication method according to any one of 15~26, wherein the TTI duration includes at least two OFDM symbols in case of DFT-S-OFDM.

28. The wireless communication method according to any one of 15~27, wherein the threshold value is equal to one of 5, 6, 7, 8, 9, 10.

29. A base station, comprising: circuitry which, in operation, generates a configuration signal indicating a time domain resource for transmitting or receiving a physical sidelink channel in a carrier; a transmitter which, in operation, transmits the configuration signal to a user equipment, wherein a Transmission Time Interval (TTI) assigned for transmitting or receiving the physical sidelink channel in the carrier is determined by the user equipment based on the configuration signal, in which the duration of the TTI is less than a slot duration.

30. The base station according to 29, wherein the slot duration includes at least one TTIs, each of which includes one or more OFDM symbols, wherein the first TTI duration starts from the first OFDM symbol of the slot, and the OFDM symbol immediately after each of the TTI durations is reserved for a gap.

31. The base station according to any one of 29~30, wherein a long TTI duration includes a plurality of OFDM symbols, the number of which is equal to or more than a threshold value.

32. The base station according to any one of 29~31, wherein both front-loaded DMRS signals and additional DMRS signals are transmitted in the long TTI duration, in which the front-loaded DMRS signals are transmitted on the second OFDM symbol of the long TTI duration, and the additional DMRS signals are transmitted on other OFDM symbols after the second OFDM symbol.

33. The base station according to any one of 29~32, wherein a short TTI duration includes at least one OFDM symbols, the number of which is less than the threshold value.

34. The base station according to any one of 29~33, wherein only front-loaded DMRS signals are transmitted on the second OFDM symbol of the short TTI duration without additional DMRS signal transmitted.

35. The base station according to any one of 29~34, wherein in the TTI, the OFDM symbols occupied by PSCCH are less than the OFDM symbols occupied by PSSCH.

36. The base station according to any one of 29~35, wherein the PSCCH and the PSSCH are Frequency Division Multiplexed (FDMed) within the same OFDM symbols in the carrier.

37. The base station according to any one of 29~36, wherein the duration of a resource selection window and/or duration of a sensing window is determined according to the duration of the TTI.

38. The base station according to 37, wherein the TTI with a duration larger than a threshold value is sensed in the sensing window for transmission of TTI with a long duration.

39. The base station according to 37, wherein the TTI duration that is used for measuring S-RSSI in the sensing window is the same as the TTI duration that is used for ranking resource candidate in the resource selection window.

40. The base station according to any one of 29~39, wherein the OFDM symbols in different TTIs within the slot are orthogonal in time domain.

41. The base station according to any one of 29~40, wherein the TTI duration includes at least two OFDM symbols in case of DFT-S-OFDM.

42. The base station according to any one of 29~41, wherein the threshold value is equal to one of 5, 6, 7, 8, 9, 10.

43. A wireless communication method for a base station, comprising: generating a configuration signal indicating a time domain resource for transmitting or receiving a physical sidelink channel in a carrier; transmitting the configuration signal to a user equipment, wherein a Transmission Time Interval (TTI) assigned for transmitting or receiving the physical sidelink channel in the carrier is determined by the user equipment based on the configuration signal, in which the duration of the TTI is less than a slot duration.

44. The wireless communication method according to 43, wherein the slot duration includes at least one TTIs, each of which includes one or more OFDM symbols, wherein the first TTI duration starts from the first OFDM symbol of the slot, and the OFDM symbol immediately after each of the TTI durations is reserved for a gap.

45. The wireless communication method according to any one of 43~44, wherein a long TTI duration includes a plurality of OFDM symbols, the number of which is equal to or more than a threshold value.

46. The wireless communication method according to any one of 43~45, further comprising: transmitting front-loaded DMRS signals on the second OFDM symbol of a long TTI duration, and the additional DMRS signals on other OFDM symbols after the second OFDM symbol.

47. The wireless communication method according to any one of 43~46, wherein a short TTI duration includes at least one OFDM symbols, the number of which is less than the threshold value.

48. The wireless communication method according to any one of 43~47, further comprising: transmitting only front-loaded DMRS signals on the second OFDM symbol of the short TTI duration without additional DMRS signal transmitted.

49. The wireless communication method according to any one of 43~48, wherein in the TTI, the OFDM symbols occupied by PSCCH are less than the OFDM symbols occupied by PSSCH.

50. The wireless communication method according to any one of 43~49, wherein the PSCCH and the PSSCH are Frequency Division Multiplexed (FDMed) within the same OFDM symbols in the carrier.

51. The wireless communication method according to any one of 43~50, further comprising: determining the duration of a resource selection window and/or duration of a sensing window according to the duration of the TTI.

52. The wireless communication method according to 51, wherein the TTI with a duration larger than a threshold value is sensed in the sensing window for transmission of TTI with a long duration.

53. The wireless communication method according to 51, wherein the TTI duration that is used for measuring S-RSSI in the sensing window is the same as the TTI duration that is used for ranking resource candidate in the resource selection window.

54. The wireless communication method according to any one of 43~53, wherein the OFDM symbols in different TTIs within the slot are orthogonal in time domain.

55. The wireless communication method according to any one of 43~54, wherein the TTI duration includes at least two OFDM symbols in case of DFT-S-OFDM.

56. The wireless communication method according to any one of 43~55, wherein the threshold value is equal to one of 5, 6, 7, 8, 9, 10.

The invention claimed is:

1. A communication apparatus, comprising:
   circuitry, which, in operation, determines consecutive consecutive symbols used for a sidelink communication within a slot; and
   a transmitter, which, in operation, transmits a physical sidelink shared channel (PSSCH) in the consecutive symbols within the slot, wherein
   a number of symbols of the consecutive symbols is less than a number of symbols within the slot,
   in response to the number of symbols of the consecutive symbols being 8, a second symbol and a sixth symbol of the consecutive symbols are used for demodulation reference signals (DMRSs),
   the number of symbols of the consecutive symbols is more than a number of consecutive symbols used for a transmission of a physical sidelink control channel (PSCCH) within the slot,
   the PSSCH and the PSCCH are assigned in a frequency division multiplexing (FDM) manner, and
   a first part of a frequency band is used for the PSCCH, a second part of the frequency band, different from the first part of the frequency band, is used for the PSSCH, and the first part of the frequency band is used for the PSSCH after the consecutive symbols used for the transmission of the PSCCH.

2. The communication apparatus according to claim 1, wherein a symbol next to a last symbol of the consecutive symbols is a guard period.

3. The communication apparatus according to claim 1, wherein the number of symbols of the consecutive symbols is more than one symbol.

4. The communication apparatus according to claim 1, wherein a first symbol of the slot is not used for a DMRS irrespective of the number of symbols of the consecutive symbols.

5. The communication apparatus according to claim 1, wherein in response to the number of symbols of the consecutive symbols becoming smaller, fewer symbols are used for the DMRSs.

6. The communication apparatus according to claim 5, wherein a second symbol of the slot is used for a DMRS in a case the number of symbols of the consecutive symbols is less than a threshold.

7. The communication apparatus according to claim 1, wherein a second symbol of the slot is used for a DMRS in a case the number of symbols of the consecutive symbols is less than a threshold.

8. The communication apparatus according to claim 1, wherein the number of symbols of the consecutive symbols is selected from a plurality of numbers of symbols.

9. The communication apparatus according to claim 1, wherein in response to the number of symbols of the consecutive symbols being less than 8 symbols, a second symbol of the slot is used for the DMRSs.

10. A communication method, comprising:
    determining consecutive symbols used for a sidelink communication within a slot; and
    transmitting a physical sidelink shared channel (PSSCH) in the consecutive symbols within the slot, wherein
    a number of symbols of the consecutive symbols is less than a number of symbols within the slot,
    in response to the number of symbols of the consecutive symbols being 8, a second symbol and a sixth symbol of the consecutive symbols are used for demodulation reference signals (DMRSs),
    the number of symbols of the consecutive symbols is more than a number of consecutive symbols used for a transmission of a physical sidelink control channel (PSCCH) within the slot,
    the PSSCH and the PSCCH are assigned in a frequency division multiplexing (FDM) manner, and
    a first part of a frequency band is used for the PSCCH, a second part of the frequency band, different from the first part of the frequency band, is used for the PSSCH, and the first part of the frequency band is used for the PSSCH after the consecutive symbols used for the transmission of the PSCCH.

11. The communication method according to claim 10, wherein a symbol next to a last symbol of the consecutive symbols is a guard period.

12. The communication method according to claim 10, wherein the number of symbols of the consecutive symbols is more than one symbol.

13. The communication method according to claim 10, wherein a first symbol of the slot is not used for a DMRS irrespective of the number of symbols of the consecutive symbols.

14. The communication method according to claim 10, wherein in response to the number of symbols of the consecutive symbols becoming smaller, fewer symbols are used for the DMRSs.

15. The communication method according to claim 14, wherein a second symbol of the slot is used for a DMRS in a case the number of symbols of the consecutive symbols is less than a threshold.

16. The communication method according to claim 10, wherein a second symbol of the slot is used for a DMRS in a case the number of symbols of the consecutive symbols is less than a threshold.

17. The communication method according to claim 10, wherein the number of symbols of the consecutive symbols is selected from a plurality of numbers of symbols.

18. The communication method according to claim 10, wherein in response to the number of symbols of the consecutive symbols being less than 8 symbols, a second symbol of the slot is used for the DMRSs.

* * * * *